Sept. 1, 1964  O. S. LLOYD  3,146,621
METERING PUMP

Filed April 4, 1962  3 Sheets-Sheet 1

INVENTOR.
Otis S. Lloyd,
BY
Paul & Paul
ATTORNEYS.

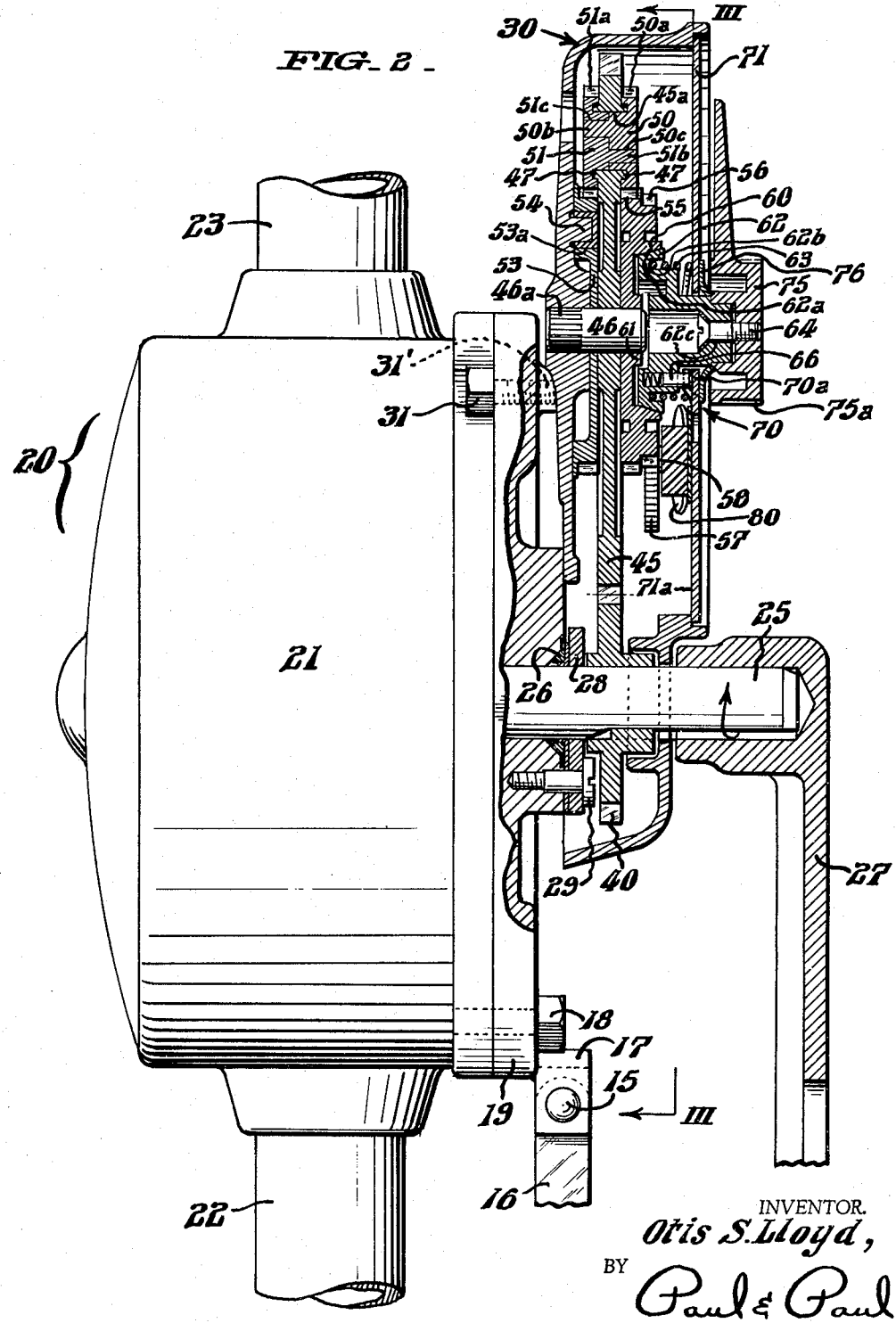

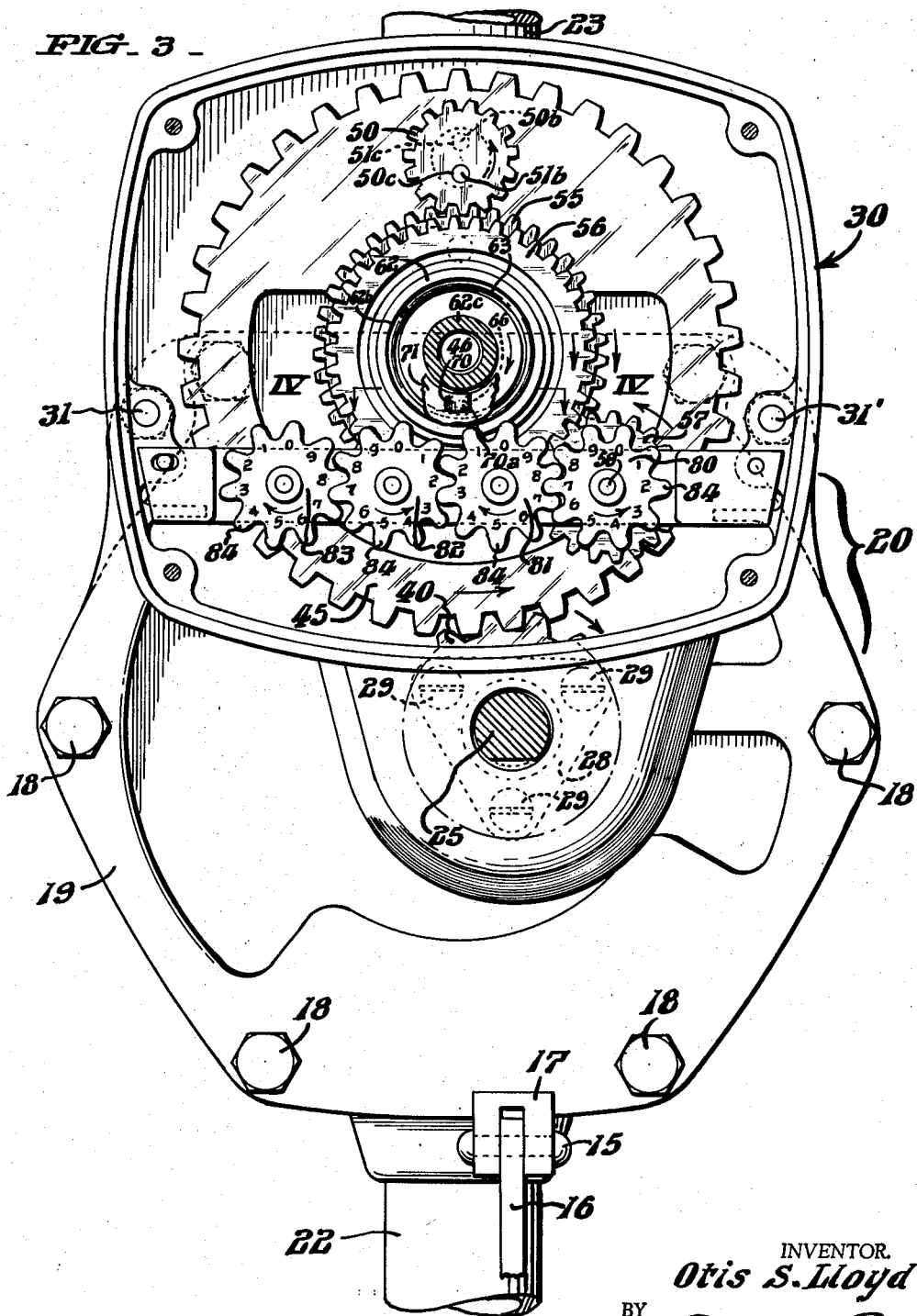

United States Patent Office 3,146,621
Patented Sept. 1, 1964

3,146,621
METERING PUMP
Otis S. Lloyd, Lansdale, Pa., assignor to William M. Wilson's Sons, Inc., Lansdale, Pa., a corporation of Pennsylvania
Filed Apr. 4, 1962, Ser. No. 185,047
5 Claims. (Cl. 73—194)

This invention relates to pumps, particularly, rotary pumps which incorporate metering means to indicate the amount of fluid delivered by said pumps.

The prior art discloses various mechanisms for metering the flow of fluid through a pump. However, these mechanisms have certain limitations and disadvantages. Some meters cannot be reset to the zero position once the counting or recording has begun, and others register the flow of fluid only when the pump or pump rotor has passed through one complete revolution. Such meters would not indicate the amount of fluid discharge by the action of the pump in rotating through less than one complete revolution. Other meters of the prior art provide no means or methods of resetting the flow indicator without disturbing the counting mechanism. The above described disadvantages are overcome in the metering pump of my invention in which the meter indicator continuously indicates the exact amount of fluid discharged from the pump at every position of the rotor or pump shaft. Further, the metering pump of my invention incorporates a series of recording dials for recording the pumping cycles or revolutions of the rotor shaft together with an adjustable pointer which may be returned to the zero position without disturbing or otherwise disengaging the recording dials. In addition, my invention provides means whereby the entire metering mechanism is located in a separate, compact compartment detachable from the pump compartment so that the meter may be removed and repaired without preventing or limiting in any way the use of the pump.

In addition to the above outline objects and advantages, my invention is further directed toward the provision of a pump of the kind referred to in which the metering means is simple in construction, lends itself to expeditious production in quantity and at small cost, and which, moreover, is foolproof and immune to easy derangement in protracted use.

Other objects and advantages will appear from the following detailed description of the invention having reference to the attached drawings, wherein:

FIG. 2 is a side elevational view, partly broken away and partly in section, showing one form of the metering mechanism of this invention;

FIG. 3 is a front elevational view, taken along the lines and arrows III—III of FIG. 2 in which the dial and pointer have been removed;

Figure 1:
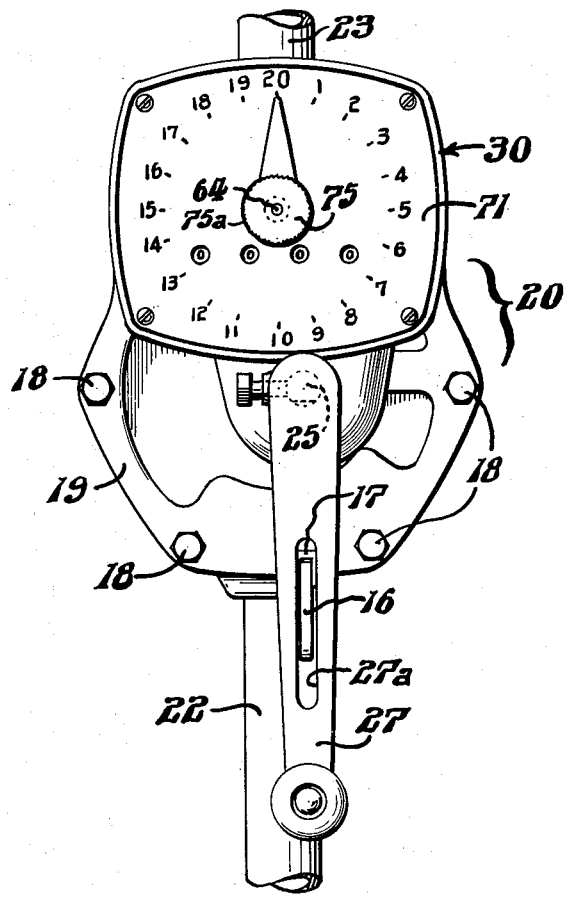
FIG. 1 is a front elevational view of one specific form of this invention showing the dial and pointer of the meter as they are positioned in relation to the pump.

As herein described, and as shown in FIG. 2, pump 20 comprises a main pump compartment 21 having a cover plate 19 removably secured thereto by screw bolts 18, and an inlet pipe 22 and an outlet pipe 23 forming part of said compartment.

Pump compartment 21 is generally circular in shape and has a pump shaft 25 eccentrically disposed therein. Mounted upon pump shaft 25 within compartment 21 is a rotor (not shown) having a plurality of impeller blades (not shown) slidably guided and yieldingly urged outwardly by springs (not shown) for maintenance of the distal edges of said blades in effective engagement with the inner peripheral surface of main pump compartment 21. The operation and construction of the above described pump mechanism is well known in the prior art and such knowledge is incorporated herein by reference. When pump shaft 25 is turned clockwise, as viewed in FIG. 1, fluid is drawn upward through the inlet pipe 22 by action of the impeller blades and discharged through the outlet pipe 23 in a manner charcteristic of such pumps. Pump shaft 25 being circular in shape within chamber 21, extends through an annular fluid seal bearing 26 held in place by a triangular shaped plate 28 and screws 29 which form part of the self-contained pump 20. Attached to the distal or D-shaped end of shaft 25 is pump crank 27 by which the shaft and the rotor and impeller blades are rotated. Mounted on the bottom portion of face plate 19, as shown in FIGS. 2 and 3, is a support bracket 17 which holds a rotatable bar 16 by means of a pin 15. The bar 16 is constructed of such thickness that the distal end will pass within a longitudinal groove 27a positioned near the center of pump crank 27, as shown in FIG. 1, so as to prevent the rotation of crank 27 when so desired.

The entire meter mechanism is mounted within a separate molded case 30 which is attached to the front of the pump chamber 21, by two cap screws 31 and 31', as shown in FIG. 2. By removing the pump crank 27 and the cap screws 31 and 31', the meter mechanism may be separated from the pump itself. Upon replacing crank 27 the pump can then be operated in a normal fashion without the meter being in service.

The particular form of meter mechanism, described and shown especially in FIG. 2 of the drawing, consists of a shaft driving spur gear 40 fixedly mounted on the D-shaped portion of pump shaft 25. Gear 40 meshes with or engages the main meter drive spur gear 45 which is mounted on and rotates freely around stationary shaft 46. Shaft 46 is held firmly in place in meter case 30 by means of a fluted portion 46a of said shaft. Mounted within a bore 45a positioned near the perimeter of gear 45 are two planetary spur gears 50 and 51, positioned within bore 45a so that the peripheral spurs 50a, and 51a, respectively, of the planetary gears extend outwardly and beyond both faces of gear 45. The planetary gears 50 and 51 are attached to each other so as to rotate as a single unit by means of two plug-like extensions 50b, 51b, which fit into and engage correspondingly shaped bores 50c, 51c, respectively, in the opposing planetary gear. The main meter drive gear 45 has a pair of annular lips 47 which extend around the perimeter of bore 45a and which assist in holding the two planetary gears 50, 51 in proper position. Planetary gear 51, the left-hand gear as viewed in FIG. 2, meshes with a stationary gear 53 which is mounted on shaft 46. Stationary gear 53 is rigidly held in position and prevented from rotating by a plug 54 which extends through casing 30 and into a bore 53a in gear 53. Planetary gear 50, the right-hand gear as viewed in FIG. 2, meshes with a clutch spur gear 55 which is mounted for free rotation on shaft 46. In order to obtain the desired clockwise rotation of clutch spur gear 55, gears 53 and 55 can be provided with different diameters or gear 53 can have more teeth than gear 55 even while planetary gears 50 and 51 are duplicates. For examples, gear 53 can be provided with 58 teeth, gears 50 and 51 with 21 teeth and gear 55 with 57 teeth, an odd number evenly distributed over a gear circumference regularly having 58 teeth. Of course, these gear sizes constitute only one embodiment and the arrangement will vary upon the size and capacity of the pump and counter. As shown also in FIG. 3, clutch gear 55 has a second series of spurs forming a second gear 56 attached to its face. Gear 56 rotates as a unit with gear 55 and meshes with a counting gear 57 which revolves on and is fixed to a counting shaft 58. Shaft 58, in turn, supports and causes to rotate the first of a series of counting wheels or dials 80.

Figure 4:
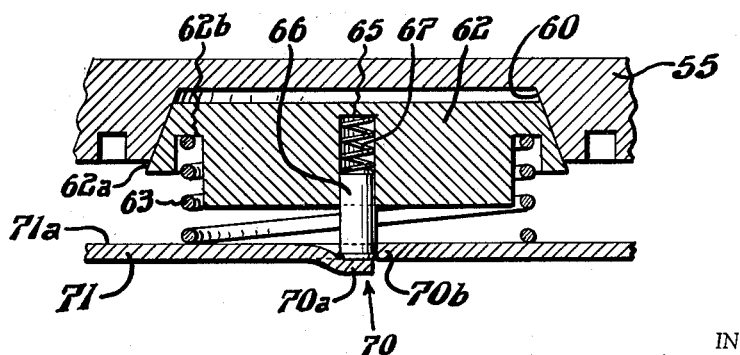
FIG. 4 is a sectional plan view, taken along the lines and arrows IV—IV of FIG. 3.

Clutch gear 55 has a conically shaped recessed area 60 positioned at its hub, the lower part of which is shown in section in FIG. 4. The recessed area 60, as shown in FIG. 2, has conically shaped sides and a hub portion 61 which surrounds shaft 46 and supports the remaining portions of the clutch gear 55. Shaped to fit within and against the recessed area 60 of gear 55 and to rotate with said gear is a truncated cone shaped clutch 62, shown in section in FIG. 2. Clutch 62 has an annular recessed groove 62b in which is mounted a spiral spring 63. Clutch 62 also has a center portion 62c in which is mounted a screw 64 which is threaded into the pointer 75. As shown in FIG. 2, clutch 62 rotates with clutch gear 55 when the conically shaped surface 62a of clutch 62 enters into the recessed area 60 and, by reason of the pressure of spring 63, is caused to frictionally bind and rotate with gear 55 as one unit. Located near the bottom portion of clutch 62, shown in FIGS. 2 and 4, is a bore 65 in which a plug 66 is slidably mounted and directed outwardly by a spring 67. Plug 66 functions with a stop 70, which is a portion of the dial face 71, to prevent the reset rotation of the pointer 75, in a counterclockwise direction as shown in FIG. 1, beyond the zero position. As shown in FIGS. 3 and 4, stop 70 consists of an L-shaped displaced portion 70a of the dial 71 positioned adjacent the center portion 62c (FIG. 2) of clutch 62. As clutch 62 rotates clockwise, as shown in FIG. 2, plug 66 slides out of the displaced portion 70a by compressing spring 67 and then slides entirely around the back face 71a of the dial 71. When the clutch 62 and pointer 75 pass through the zero position while counting or recording the fluid discharged by the pump 20, moving clockwise as shown in FIGS. 1 and 3, plug 66 passes harmlessly over stop 70. When the pointer is reset to the zero position and rotated counterclockwise as shown in FIGS. 1 and 3, plug 66 follows a circular course around the face 71a until it enters behind displaced portion 70a and moves against the protruding edge 70b. As plug 66 rests directly against edge 70b and is prevented from further rotation, the clutch 62 and pointer 75 are similarly held against further movement in a counterclockwise direction.

An annular seal 76, shown in FIG. 2, extends entirely around the hub portion 62c of clutch 62 and is attached to the front face of dial 71 thereby preventing foreign matter from working into the meter mechanism and meter casing 30. Pointer 75 is equipped with knurled hub portion 75a which is used to grasp the pointer and to reset or return it to the zero position.

As shown in FIG. 3, the four counting wheels 80, 81, 82 and 83 are arranged in tandem relationship and in a slightly lateral position to each other. Each wheel has a series of numerals positioned around its face so that upon revolution of the wheel the single numeral on each wheel positioned at the top thereof indicates the movement of the wheel. Each counting wheel 80–83 is equipped with a plurality of perimeter spurs 84 and each wheel except wheel 83, the last driven wheel, has one driving spur (not shown) located behind the face as viewed in FIG. 3. Said driving spur causes the adjacent wheel to rotate by meshing with the perimeter spurs 84 in a manner well known in the art. As wheels 80–82 have the single driving spur (not shown) which meshes with the perimeter spurs 84 of the adjacent wheels, the driving wheel will rotate through an entire revolution as the adjacent driven wheel rotates through a portion of one revolution. As the numerals on each wheel are numbered in units of tens, the first dial 80 indicates a complete revolution of counting shaft 58 by counting from 0 to 0 as the second wheel 81 changes from 0 to 1. Correspondingly, as wheel 81 counts tens of revolutions of shaft 58, wheel 82 counts hundreds of revolutions of shaft 58 and wheel 83 counts thousands of revolutions of shaft 58.

It should be understood that the counting wheels 80–83 do not record directly the number of revolutions of the pump shaft 25, but that said wheels record a derivative number thereof. Since pumps of this character intended for hand operation normally deliver one pint of fluid or a little more per revolution, in order to have the indicating dial and the counting wheels read in a useful number of gallons, such as 20, the reduction between the turns of the crank and the turns of the pointer must be 20 multiplied by the number of turns of the crank required to pump one gallon. In the pump illustrated, one turn of the crank delivers approximately 1/7 of a gallon, therefore, the reduction gearing must have a reduction of 140 to 1. Such gearing arranged in ordinary spur gears would be bulky and expensive and for these reasons impractical. The present invention utilizes a very compact form of planetary gearing which affects this reduction within an exteremely compact space.

In operation, the specific form of metering pump of my invention as described and shown in the attached drawings functions as follows:

When the pump crank 27 is rotated in the pumping direction, clockwise as shown in FIG. 1, the impeller blades (not shown) draw fluid from pipe 22 into chamber 21 and discharge the fluid into outlet pipe 23. Rotating with shaft 25 is pump shaft gear 40 which drives gear 45 in the counterclockwise direction as viewed in FIG. 3. As gear 45 rotates around stationary shaft 46, planetary gear 51 is caused to rotate in the same or counterclockwise direction as it engages stationary gear 53 and thereby causes connected planetary gear 50 to rotate. Planetary gear 50 engages clutch gear 55 which rotates clockwise along with gear 56 attached thereto. As clutch 62 is pressed and driven into the recessed area 60 of clutch gear 55 by action of spring 63, the clutch 62 rotates with gear 55 as a single unit causing the pointer 75 to rotate indicating units of fluid pumped. Gear 56, rotating with gear 55, causes counting gear 57 to rotate in a counterclockwise direction and said gear rotates shaft 58 which in turn rotates the fixedly mounted counting wheel 80. This motion is recorded by the counting wheels 80–83.

As fluid is being pumped, pointer 75 revolving around the face of dial 71 accurately and continually shows the number of units of fluid passing through the pump and the fluid passing at each position of the crank. When it is desired to return pointer 75 to the zero position for a new pumping operation, the pointer is grasped by the knurled surface 75a, pulled out and away from dial 71 so as to disengage clutch 62 from gear 55. The pointer is rotated in a counterclockwise direction until stop 70 operates to prevent further rotation by means of plug 66 resting against the edge 70b of the rear face 71a of dial 71. As clutch 62, supporting pointer 75, is separate and distinct from the direct counting wheels 80–83 which receive their impetus by means of gear 56, counting gear 57 and connecting shaft 58, when the pointer is reset, this movement does not disturb or otherwise render inoperative the counting mechanism and the count as recorded on the counting wheels.

The specific form of the metering pump as described and shown in the attached drawings, provides a continuous, positive action counting mechanism which indicates at all times the exact amount of fluid passing through the pump. In addition, the mechanism incorporates means whereby the pointer may be returned to the zero position when desired without disengaging the counting wheels. Further, as described herein, my invention incorporates a detachable meter case which allows the full operation of the pump when the meter is being repaired.

It should be understood that the meter of this invention may be employed with a variety of pumps employing power means other than a crank such as an electric motor. Similarly, the pumps may discharge other than fluid materials such as air or gas. Likewise, other alterations and changes can be made in the mechanism as described without departing from the essential nature of the invention. For example, a different gear train can be employed, also different recording dials and a modified clutch may be utilized. However, all such modifications will be well within the spirit of my invention and within the scope of the appended claims.

I claim:

1. A continuously recording resettable meter for rotary pumps for recording the amount of fluid discharged by the pump as indicated by the revolutions of the pump shaft, said meter comprising
   a rotatable shaft,
   a pump shaft gear mounted on and rotating with the pump shaft, said gear engaging a main meter gear, the main meter gear having a pair of connected planetary gears rotatably mounted in a bore adjacent the perimeter of the meter gear,
   a stationary gear engaging one planetary gear,
   a clutch gear engaging the other planetary gear,
   a clutch biased into operative contact with the clutch gear and
   a resettable pointer mounted on the clutch for movement therewith whereby the pointer is caused to rotate in the counting direction relative to the rotation of the pump shaft, said pointer being reset to the zero position by movement of the clutch relative to the clutch gear.

2. The counter as defined in claim 1 wherein said clutch is provided with a truncated conical surface at one end fitting within a complementary shaped recessed area in the clutch gear, said clutch being normally spring biased into operative contact with the clutch gear so that the pointer rotates as the pump shaft rotates, and means is provided for opposing said bias whereby the pointer may be reset to the zero position without affecting movement of the clutch gear.

3. The counter as defined in claim 2 wherein is provided a plurality of counting wheels and means for driving said wheels, said means comprising a first gear engaging the clutch gear, said first gear mounted on and causing a shaft to rotate, a first counting wheel being fixedly mounted on said shaft whereby movement of the clutch gear is transferred to said counting wheel.

4. The counter as defined in claim 3 wherein the counting wheels comprise a plurality of over-lapping, laterally arranged spur gears having numerals arranged around the peripheral edge of the front face of each wheel.

5. The counter as defined in claim 4 wherein is provided a spring biased reset stop mounted in the clutch and operative against a stationary member, said stop and member arranged so that the stop is urged against the member preventing further movement of the pointer in the resetting direction when the pointer is at the zero position and said stop permitting free movement of the pointer in the counting direction.

References Cited in the file of this patent
UNITED STATES PATENTS

| | | |
|---|---|---|
| 1,275,865 | Davis | Aug. 13, 1918 |
| 1,608,606 | McNab | Nov. 30, 1926 |
| 1,684,926 | Pierce et al. | Sept. 18, 1928 |
| 2,026,368 | Warren | Dec. 31, 1935 |